United States Patent
Ouyang

(10) Patent No.: US 6,728,361 B1
(45) Date of Patent: Apr. 27, 2004

(54) METHOD AND SYSTEM FOR SWITCHING SHORT-CODE ACCESSES BASED ON ORIGINATION TIME AND SERVICE AREA

(75) Inventor: James Ouyang, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 216 days.

(21) Appl. No.: 09/705,018

(22) Filed: Nov. 2, 2000

(51) Int. Cl.$^7$ .................. H04M 7/00; H04M 1/64; H04M 11/00; H04M 3/42
(52) U.S. Cl. ............... 379/221.08; 379/88.01; 455/406; 455/414
(58) Field of Search ............ 379/221.08, 220.01, 379/88.01; 455/406, 414; 358/84; 235/383

(56) References Cited

U.S. PATENT DOCUMENTS

| | | | |
|---|---|---|---|
| 4,926,255 A | * 5/1990 | Von Kohorn | 358/84 |
| 5,764,731 A | * 6/1998 | Yablon | 379/88.01 |
| 5,835,583 A | * 11/1998 | Hetz et al. | |
| 6,185,289 B1 | * 2/2001 | Hetz et al. | |
| 6,386,450 B1 | * 5/2002 | Ogasawara | 235/383 |
| 6,397,057 B1 | * 5/2002 | Malackowski et al. | 455/414 |
| 6,411,803 B1 | * 6/2002 | Malackowski et al. | 455/406 |

* cited by examiner

Primary Examiner—Ahmad F. Matar
Assistant Examiner—Thjuan P Knowlin
(74) Attorney, Agent, or Firm—John D. Crane; Bracewell & Patterson, L.L.P.

(57) ABSTRACT

A method and system for switching short code telephone calls based on origination time and service area provides a reusable set of short codes for call switching in conjunction with radio promotions and other short-term uses. A database-managed switching system manages the use of the short-code identifier so that the identifier is switched to a particular exchange in conformity with a time period for which the switching is established. In addition, the service area of the originating station can determine the switching path, so that the same identifier can be used simultaneously in multiple geographical regions.

25 Claims, 4 Drawing Sheets

METHOD AND SYSTEM FOR SWITCHING SHORT-CODE ACCESSES BASED ON ORIGINATION TIME AND SERVICE AREA

BACKGROUND OF THE INVENTION

1. Technical Field

The present invention relates generally to telephone systems, and more particularly, to a method and system for switching short-code accesses based on origination time and service area.

2. Description of the Related Art

The development of sophisticated computerized telephone switching networks has enabled the development of specialized switching services based on computerized recognition of dialed numbers that are not the final destination identifier. Signaling System 7 (SS7) networks are presently in use to provide 1-800 access numbers (using the 800 area code) to route toll free calls to particular telephone exchange identifiers.

The availability of short access codes is limited, e.g., there are only 100 two-digit access codes available at a given dial-out location. The limited availability of these codes and the likelihood of high demand for the shortest access codes makes it desirable to reuse codes after they are no longer needed, and make it possible to use the same code simultaneously for different purposes in different geographical regions.

In radio advertising and other applications where telephone numbers are temporarily used, allocation of a short access code to provide user response is impractical if the short access codes cannot be re-used or multiplexed so that multiple advertisers can be serviced with a limited number of short access codes.

In light of the foregoing, it would be desirable to provide an improved method and system for switching a short code access.

SUMMARY OF THE INVENTION

The objectives of reusing telephone access codes and simultaneously using access codes in different geographical regions are achieved in a method and system for switching short-code accesses based on call origination time and service area. A service control point data base is initialized with switching information for a short-code access number including a time period and a destination. When a short-code dialed access to the short-code access number is received, the system determines whether or not the time period has expired, and if the time period has not expired, the call is switched to the destination.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

DESCRIPTION OF AN ILLUSTRATIVE EMBODIMENT

Figure 1:
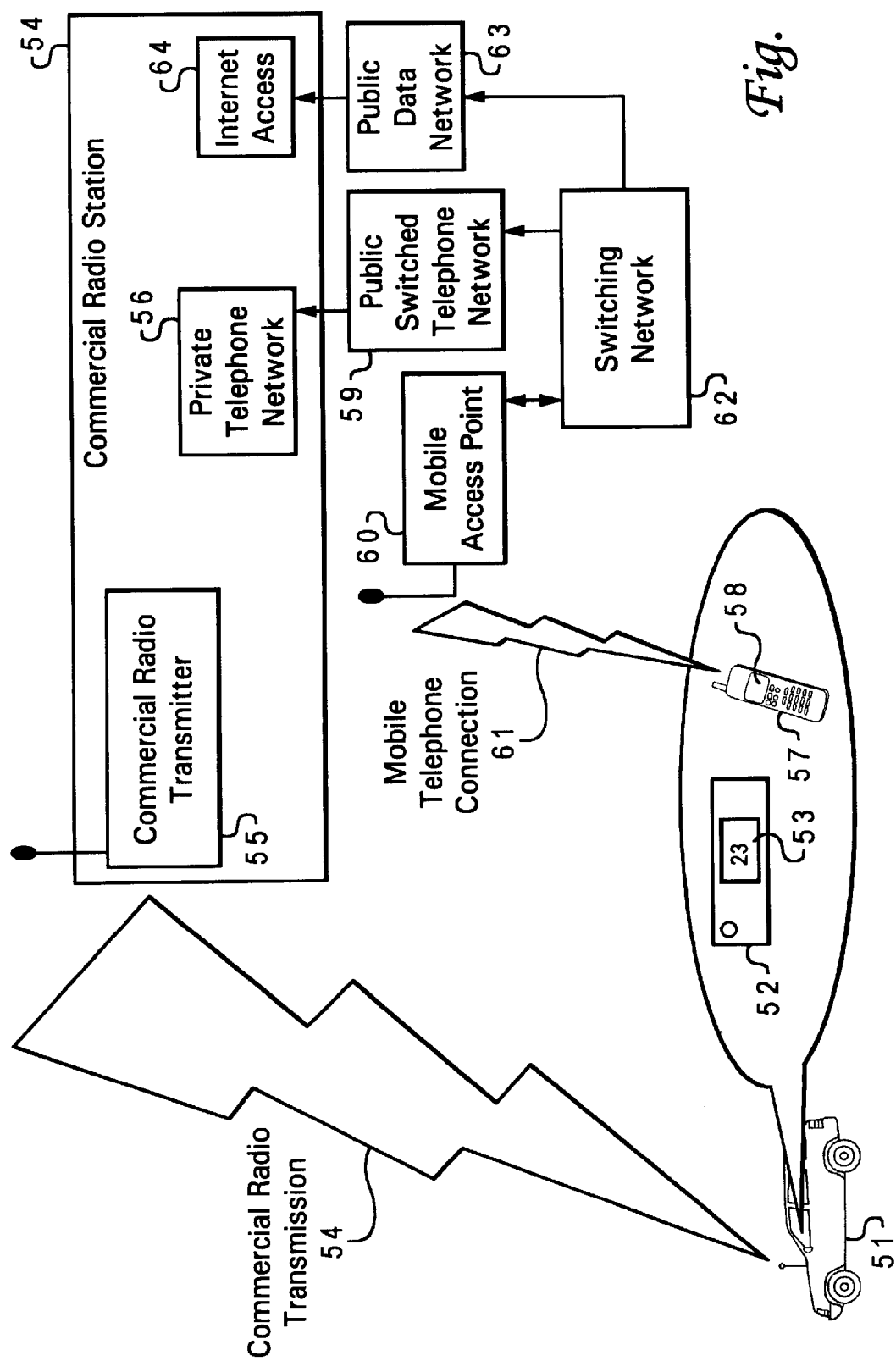
FIG. 1 is a pictorial diagram of a switching network in accordance with a first embodiment of the present invention.

With reference now to the figures, and in particular with reference to FIG. 1, a switching network in accordance with a first embodiment of the invention is depicted. The network is designed to prompt a user with a short-code access number, and routing a dialed access to the short-code access number based on a time interval in which routing information for the short-code access number indicates a valid destination. A radio listener located within an automobile 51, receives a prompt to dial a short-code access number. The user can then dial the short-code access number on a mobile telephone 57. The user prompt may be part of the audio portion of a commercial radio transmission produced by commercial radio station 54 and playable through the automobile radio receiver 52, or the prompt might be sub-carrier encoded information that may be used to display the short-code access number on a visual display 53. Alternatively, the short-code access number can be displayed on the display 58 provided within mobile telephone 57, but this is not generally preferred, as it is more difficult to read these displays and the number is not directly linked to the broadcast. Additionally the user would have to select from a list if several short-code accesses were available at once in the same location.

When the user receives the short-code access number prompt and desires to respond, they may dial the short-code access number on mobile telephone 57 and via mobile telephone connection 61, mobile access point 60 will receive and route the call. After receiving the access, short-code access switching network 62 uses database information to switch the call to public-switched telephone network (PSTN) 59, which passes the call on to private telephone network 56 at the commercial radio station 54. The database information contains time and destination information so that the origination time of the dialed access governs selection of destination (and whether or not there is a valid destination for a given origination time). The call might alternatively be routed to other suitable answering locations consistent with the commercial broadcast, such as a retail store advertising on the radio broadcast.

Alternatively, or in conjunction, the access may be routed through switching network 62 to public data network 63, permitting an advertiser to use INTERNET access point 64 to connect with the caller.

The time interval during which the short-code access number is valid to route the call to the commercial radio station 54 may be a "one-shot" time period, e.g., the short-code access number may be freed by the system after the time period has expired, or the time period may be repetitive, e.g., all calls during a particular hour for a given week may be routed to a particular destination number. It will be recognized to those familiar with advertising and promotions that various schemes may be employed using the telephone as a promotional tool, and the time dependant switching of the short-code dialed access of the present invention may be employed in a variety of schemes to limit the times when operators must handle calls, vary the availability of the access for promotional reasons, and for the access provider to apportion access to the short-code access to its various customers for the service.

An advantage of the present invention as applied to radio advertisements is association of a time window subsequent to the announcement of the short-code identifier can be used to "expire" the association of the short-code identifier with the target destination after a time window has elapsed. Since this may be performed automatically by removing the database entry after the time window elapses, the invention can be used to efficiently share short-code identifiers among multiple radio advertisers, automatically associating the radio commercial with the short-code identifier. This advantage also applies to INTERNET advertising, wherein a message containing the identifier can be displayed for a short time interval and the short-code identifier association similarly expired automatically.

Figure 2:
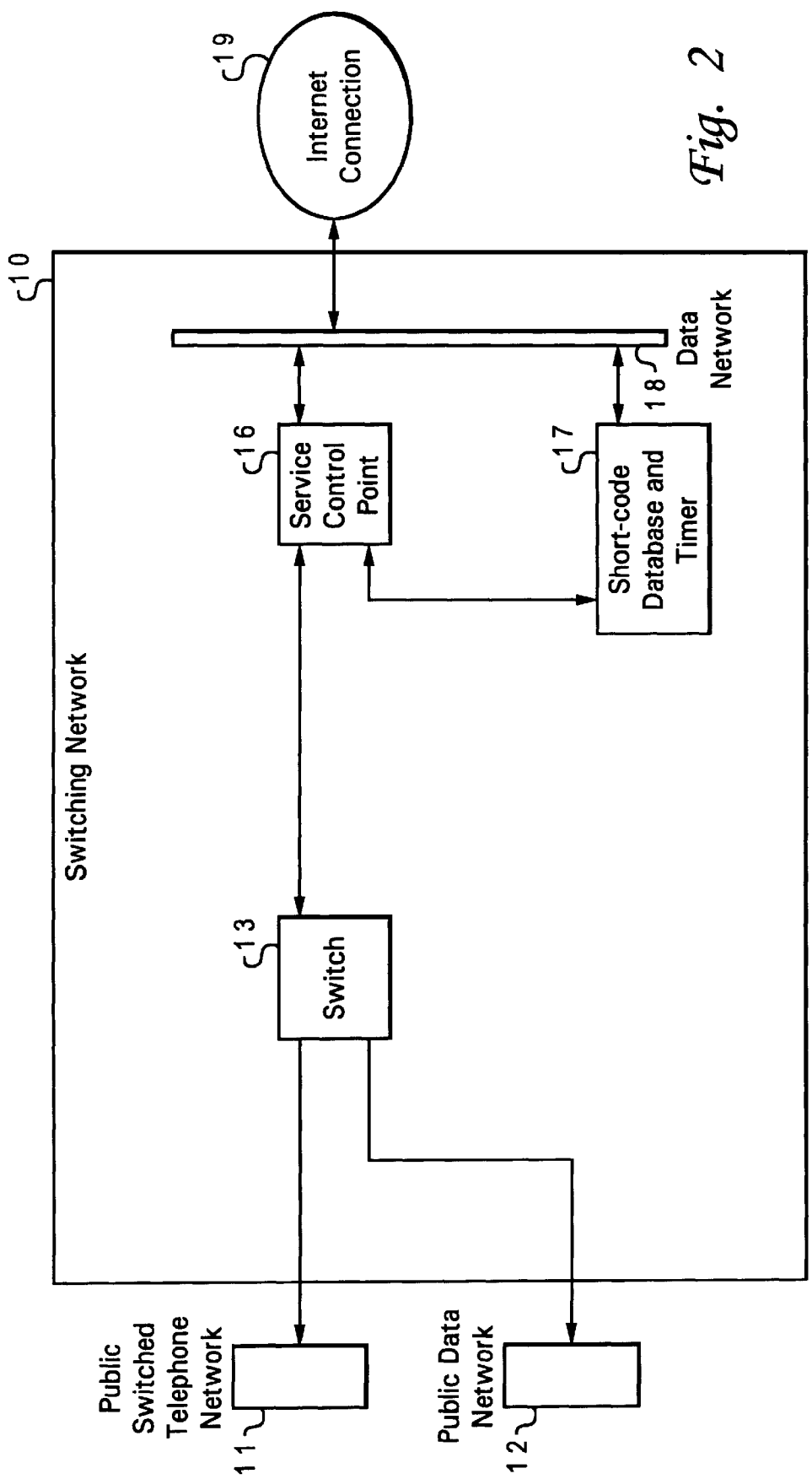
FIG. 2 is a block diagram of the switching network of FIG. 1 and associated components.

Referring now to FIG. 2, an implementation of switching network 62 of FIG. 1 is shown in block diagram form, along with associated connections. In FIG. 1 there is depicted a switching network 10 coupled to a public switched telephone network (PSTN) 11 and a public data network 12. PSTN 11 connects telephone accesses to switching network 10, which can route the calls through to other connections at PSTN 11 or to other exchanges (not shown). The present invention has particular applications to mobile telephony and wireless personal communications systems, but for the purpose of illustrating the operation of the telephone network, FIG. 2 will be understood to contemplate telephone connections and telephony in general, without specific reference to standard telephone connections or mobile telephone service providers that may be connected to PSTN 11 or directly to switching network 10.

Switching network 10 is preferably a "Signaling System 7" (SS7) network. SS7 is a global standard for telecommunications developed and promulgated by the International Telecommunication Union's Telecommunication Standardization Sector. The SS7 network allows control of both wireline and wireless telephony by enabling the digital exchange of control and routing information. One such control mechanism is 1-800 and telephone number portability mechanisms implemented by SS7 switches. Calls routed to an SS7 switch can be directed to another number using the database in an SS7 network. Referring again to FIG. 2, the database in switching network 10 is implemented in system control point 16, with additional short-code database and timer 17 added to provide the unique features of the present invention. While the features of the present invention can be implemented via improvements of the software controlling control point 16, for the purpose of clarification short-code database and timer 17 is illustrated separately, coupled to both data network 18, and system control point 16. Data network 18 can be an Ethernet network, token ring network, or other data channel appropriate for interconnecting the control data exchange necessary to support the SS7 switching network 10. Additionally, INTERNET connection 18 is provided to allow control and information exchange between switching network 10 and devices connected to the INTERNET. The switching portion of switching network 10 comprises switch 13 coupled to service control point 16, which controls routing of calls.

Figure 3:
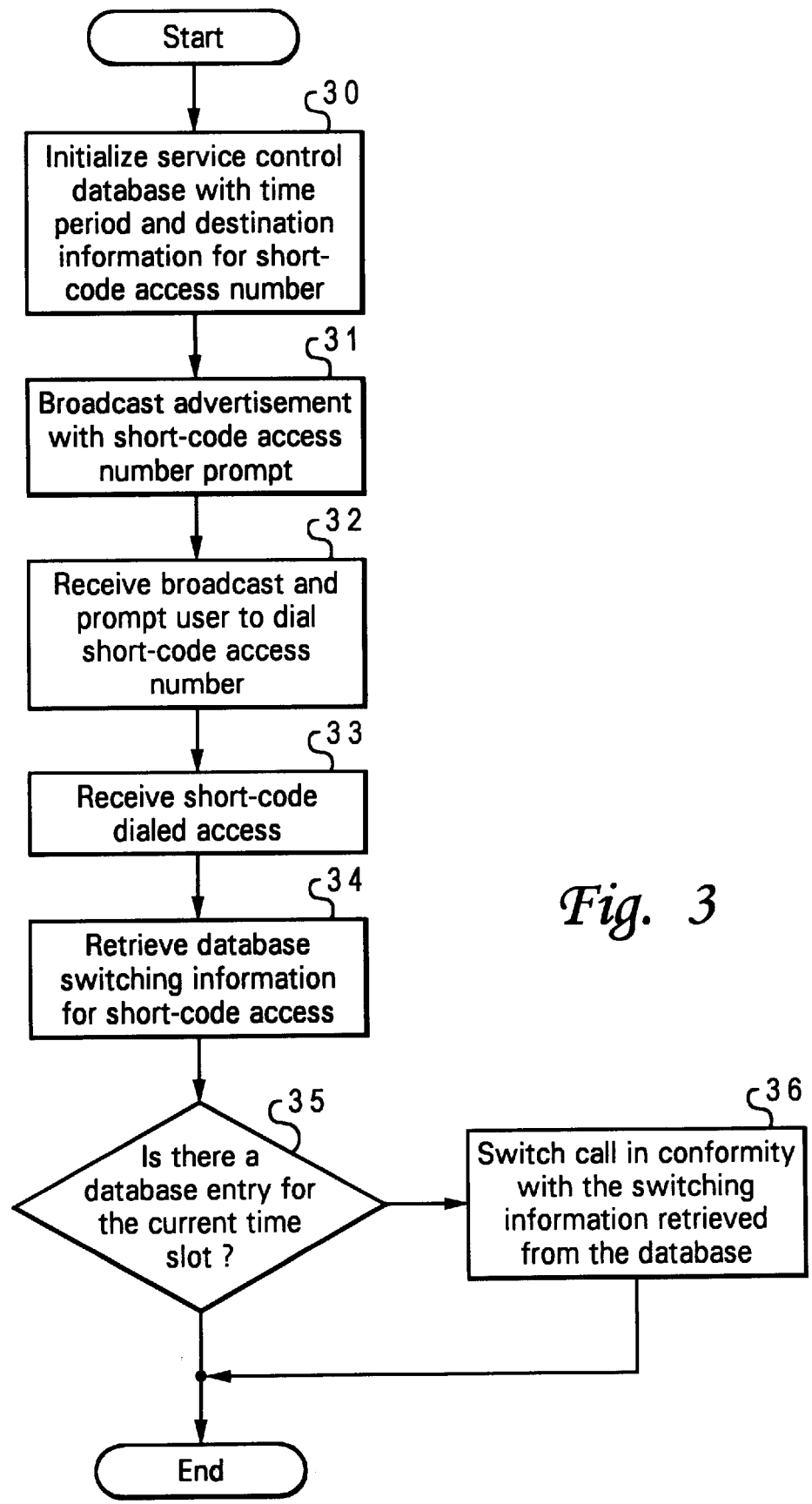
FIG. 3 is a flowchart of a method for switching short-code accesses in accordance with a preferred embodiment of the present invention.

Referring now to FIG. 3, a method for switching short-code accesses in accordance with a preferred embodiment of the invention is shown. A service control point database is initialized with time period and destination information for a short-code access number (step 30). Then, an advertisement is broadcast containing information to prompt the recipient to dial the short-code access number (step 31). This information may be the spoken audio representation of the number, or may be a special code transmitted via a subcarrier to set a display on a radio set to indicate the short-code access number to the radio listener. The broadcast may also be entirely in the digital domain, with the prompt occurring on an INTERNET web page, via e-mail or on a mobile telephone display or wireless personal digital assistant (PDA) display. When the broadcast is received, the prompt is displayed (or heard through the audio radio channel) (step 32). When the user dials the short-code access number, the access is received by switching network 10 (step 33). Switching information is retrieved for the short-code access number from the database (step 34), and if there is a database entry for the short-code in the current time slot (decision 35) the call is switched using the destination information in the database (step 36).

Figure 4:
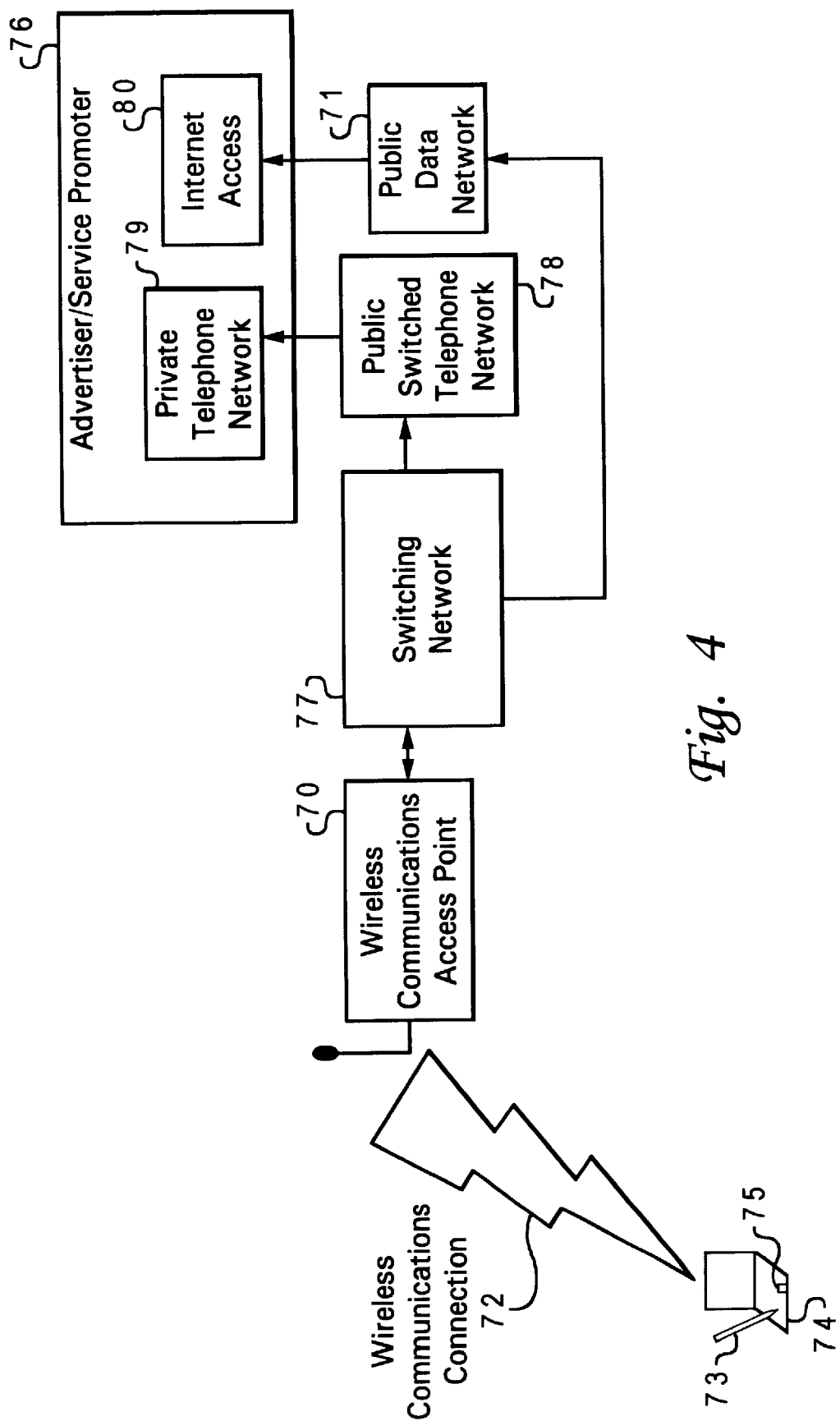
FIG. 4 is a pictorial diagram of a switching network in accordance with a second embodiment of the present invention.

Referring now to FIG. 4, a system in accordance with a second embodiment of the invention is depicted. The system is similar to that of FIG. 1 in that it is designed to present a short-code access number to a user, and route an access to the short-code access number based on a time interval in which the short-code access number is valid. A user receives a prompt to dial a short-code access number on a personal computing device 74. Personal computing device 74 is depicted as a handheld wireless device operated by a stylus 73, but may also be a notebook computer or a desktop computer. The prompt of the short-code access number may be presented on a special display or on the primary display of the personal computing device 74. The prompt may form part of an e-mail transmission or a web page displayed on personal computing device 74. The prompt is received via wireless communications connection 72, from a wireless communication service provider 70. The prompt could alternatively be transmitted through a wired INTERNET connection to a standard desktop computer that does not have a wireless connection.

After receiving the prompt, the user can then dial the short-code access number on personal computing device 74, with the telephone audio connection enabled by a transducer 75 that provides microphone and speaker capabilities for an audio connection. Alternatively the user could use a mobile telephone 57 to respond as depicted in FIG. 1.

When the user receives the short-code access number prompt and desires to respond, they may dial the short-code access number on personal computing device 74 and via wireless communication connection 72, the wireless communications access point 70 will receive and switch the call. Upon receiving the access, switching network 77 uses database information for switching the short-code access during an active time intervals to switch the call to public switched telephone network 78, which passes the call on to the private telephone network 79 at the advertiser/service provider 76. The call might alternatively be routed to other suitable answering locations consistent with the wireless transmission, such as a retail store advertising on the INTERNET via public data network 71 and INTERNET access point 80. The time interval during which the short-code access number is valid to route the call to the advertiser/service provider 76 may be a "one-shot" time period, e.g., the short-code access number may be freed by the system after the time period has expired. Alternatively, the time period may be repetitive, e.g., all calls during a particular hour for a given week may be routed to a particular destination number.

Although the invention has been described with reference to specific embodiments, this description should not be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method for switching a short-code access number, said method comprising the steps of:
   initializing a service control point database with switching information for the short-code access number including a time period and a first destination, said time period being a predetermined length of time that is independent of a time of day;
   transmitting said short-code access number to a user device while concurrently starting a timer to measure said time period;
   receiving at a switching network said short-code access number from said user device;
   in response to receiving said short-code access number at said switching network, determining whether or not said time period has expired according to said timer;
   in response to determining that said time period has not expired, switching said short-code access number to said first destination in conformity with said switching information; and
   in response to determining that said time period has expired, making said short-code access number available for switching a call to a second destination.

2. The method of claim 1, wherein said short-code access number originates within a geographic region having an associated local exchange, said switch database is associated with said local exchange, and wherein said step of switching is limited to switching through said local exchange so that said short-code access number can be simultaneously used by another local exchange without interfering with said switching.

3. The method of claim 1, wherein said switching information fiber comprises a locale identifier, and wherein said method further comprises determining whether or not said short-code access number originated within a locale identified by said local identifier, and said step of switching is further performed in conformity with a determination that said short-code access number originated within said locale.

4. The method of claim 3, wherein said locale identifier is an identifier of a cell within a cellular telephone network, and wherein said step of switching is performed in conformity with a determination that said short-code access number originated within said cell.

5. The method of claim 1, further comprising the steps of:
   receiving a broadcast message containing a representation of said short-code access number; and
   prompting a user to dial said short-code access number in response to receiving said broadcast message.

6. The method of claim 5, wherein said broadcast message contains an audio representation of said short-code access number, and wherein said step of prompting prompts said user to dial said short-code access number by hearing said audio representation.

7. The method of claim 5, wherein said broadcast message contains a coded representation of said short-code access number on a visual display and further comprising displaying said short-code access number.

8. The method of claim 1, further comprising the steps of:
   receiving a network transmission containing a representation of said short-code access number; and
   prompting a user to dial said short-code access number in response to receiving said network transmission.

9. The method of claim 8, wherein said network transmission comprises an INTERNET web page transmission, and wherein said step of prompting is performed by displaying a web page.

10. The method of claim 8, wherein said network transmission comprises an e-mail transmission, and wherein said step of prompting is performed by displaying contents of said e-mail transmission.

11. The method of claim 1, further comprising the steps of:
    determining whether or not said time period has expired; and
    freeing said shot-code access number for use with other switching information.

12. The method of claim 11, wherein said step of freeing is performed by removing said switching information from said service control point database.

13. The method of claim 12, wherein said step of determining whether or not said time period is expired is performed by determining whether or not said switching information is present within said service control point database.

14. A system for switching short-code telephone calls, wherein said system comprises:
    means for transmitting a short-code access number for a first destination to a user device while concurrently starting a timer to measure a time period, said time period being independent of a time of day;
    a service control point for receiving said short-code access, number from said user device;
    a database coupled to said service control point for controlling switching behavior, wherein said database contains switching information for said short-code access number including a time period and a destination; and
    a timer coupled to said database for determining whether or not said time period has expired when said short-code access number is received, wherein said timer indicates to said switch to switch said short-code access number to said first destination if said time period has not expired, and wherein said short-code access number is available for switching a call to a second destination if said time period has expired.

15. The system according to claim 14, wherein said short-code access number originates within a geographic region having an associated local exchange, said database is associated with said local exchange, and wherein said switch limits switching through said local exchange so that said short-code access number can be simultaneously used by another local exchange without interfering with said switching.

16. The system according to claim 14, wherein said switching information further comprises a locale identifier, and wherein'said switch further determines whether or not said short-code access number originated within a locale identified by said local identifier, and said switch switches said access in conformity with a determination that said short-code access number originated within said locale.

17. The system according to claim 14, further comprising:
    a receiver for receiving a broadcast message containing a representation of said short-code access number; and
    means for prompting a user to dial said short-code access number in response to receiving said broadcast message.

18. The system according to claim 17, wherein said broadcast message contains an audio representation of said short-code access number, and wherein said means for prompting comprises an audio transducer for reproducing said audio representation.

19. The system according to claim 17, wherein said broadcast message contains a coded representation of said short-code access number and wherein said means for prompting comprises a visual display for displaying said short code access number.

20. The system according to claim 14, further comprising:
   means for receiving a network transmission containing a representation of said short-code access number, and
   means for prompting a user to dial said short-code access number in response to receiving said network transmission.

21. The system according to claim 20, wherein said network transmission comprises an INTERNET web page transmission, and wherein said means for prompting is a visual display that can display a web page.

22. The system according to claim 20, wherein said network transmission comprises an e-mail transmission, and wherein said means for prompting is a visual display that can display said e-mail transmission.

23. The system according to claim 14, wherein said switch determines whether or not said time period has expired, and frees said short-code access number for use with other switching information.

24. The system according to claim 23, wherein said switch frees said short-code access number by removing said switching information from said database.

25. The system according to claim 24, wherein said timer determines whether or not said time period has expired by determining whether or not said switching information is present within said database.

* * * * *

UNITED STATES PATENT AND TRADEMARK OFFICE
CERTIFICATE OF CORRECTION

PATENT NO. : 6,728,361 B1
DATED : April 27, 2004
INVENTOR(S) : James Ouyang

It is certified that error appears in the above-identified patent and that said Letters Patent is hereby corrected as shown below:

Column 6,
Line 31, please delete the comma in between "access" and "number".

Signed and Sealed this

Twenty-second Day of March, 2005

JON W. DUDAS
*Director of the United States Patent and Trademark Office*